United States Patent
Weng et al.

(10) Patent No.: US 7,697,833 B2
(45) Date of Patent: Apr. 13, 2010

(54) TWO-STEP AUTO FOCUS CAMERA AND METHOD FOR DRIVING THE SAME

(75) Inventors: Cheng-Fa Weng, Taipei Hsien (TW); Ching-Hsing Huang, Taipei Hsien (TW); Jen-Te Wang, Taipei Hsien (TW); Jen-Hung Chung, Taipei Hsien (TW); Chou-Chen Shih, Taipei Hsien (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 263 days.

(21) Appl. No.: 11/850,819

(22) Filed: Sep. 6, 2007

(65) Prior Publication Data

US 2009/0022487 A1    Jan. 22, 2009

(30) Foreign Application Priority Data

Jul. 18, 2007    (CN) .................. 2007 1 0075202

(51) Int. Cl.
*G03B 3/10*    (2006.01)
*G03B 13/34*    (2006.01)

(52) U.S. Cl. ...................... 396/136; 359/824

(58) Field of Classification Search ............ 396/86, 396/133, 136
See application file for complete search history.

(56) References Cited

U.S. PATENT DOCUMENTS

| | | | | | |
|---|---|---|---|---|---|
| 4,905,031 | A | * | 2/1990 | Mody | 396/133 |
| 5,754,895 | A | * | 5/1998 | Nishino | 396/79 |
| 5,887,201 | A | * | 3/1999 | Maeno | 396/86 |
| 6,462,962 | B1 | * | 10/2002 | Cuk | 363/16 |
| 6,856,469 | B2 | * | 2/2005 | Yoneyama et al. | 359/696 |
| 7,039,309 | B2 | | 5/2006 | Hsiao | |
| 2007/0116445 | A1 | * | 5/2007 | Kozakai et al. | 396/55 |

FOREIGN PATENT DOCUMENTS

CN    1890591 A    1/2007
WO    WO 2005054923 A1 *    6/2005 ................ 396/55

* cited by examiner

*Primary Examiner*—Christopher E Mahoney
*Assistant Examiner*—Leon W Rhodes
(74) *Attorney, Agent, or Firm*—Frank R. Niranjan

(57) ABSTRACT

A two-step auto focus camera with two focal points includes a lens unit (20) and a permanent magnet (30) being fixedly mounted around the lens unit to move with the lens unit. Upper and lower coil seats (60a, 60b) are mounted around the lens unit and are arranged at upper and lower sides of the magnet, respectively. Upper and lower coils (50a, 50b) wind around the upper and lower coil seats, respectively. A circuit board (80) supplies a current to each of the coils, wherein the current to each coil has a plurality of square waves in one focusing time for the lens unit to move from one focal point to the other focal point.

14 Claims, 6 Drawing Sheets

TWO-STEP AUTO FOCUS CAMERA AND METHOD FOR DRIVING THE SAME

BACKGROUND OF THE INVENTION

1. Field of the Invention

The present invention relates generally to a lens drive mechanism of a two-step auto focus camera, and also relates to a method for driving the two-step auto focus camera.

2. Description of Related Art

Over the years cameras have evolved toward lightweight and compactness; however, conventionally an auto focus structure is used for controlling the telescopic movement of a lens of the camera; such an auto focus structure occupies a space in the camera.

The auto focus structure of the camera focuses on an object by comparing the desired focus with the image on an image sensor. The image sensor is either a charge coupled device (CCD) sensor or a complementary metal oxide semiconductor (CMOS) sensor, and is controlled by a central processing unit (CPU) installed inside the digital camera. In the beginning, the lens moves back and forth around its original position (static position). As the lens moves, the CPU compares the image from the lens with the image in the image sensor. Finally, as the lens moves to the position where the image is the clearest, then the lens stops at the position. In this case, the lens has to be continuously driven back and forth by a motor structure. Generally the motor structure is column-shaped, including coils wound therearound and a permanent magnet being mounted around the lens. During operation of the motor, a current is supplied to the coils to establish an alternating magnetic field. The magnetic field of the permanent magnet interacts with the alternating magnetic field of the coils to drive the lens to move. At the moment when the CPU detects a focused image as the lens moves back and forth, a stop signal is simultaneously sent to the motor. Therefore, the lens stops at the best focal position (static position).

However, as an outer surface of the lens and an inner surface of the motor are not smooth enough, the lens may swing during telescopic movement, and thus may get stuck to the motor due to the rough contacting surfaces of the motor and the lens, which, in most cases, results in that the lens of the camera has an unstable movement or even cannot move anymore. Such a shortcoming needs to be solved.

SUMMARY OF THE INVENTION

The present invention relates, in one aspect, to a two-step auto focus camera having two focal points. The two-step auto focus camera includes a lens unit having a barrel and a lens received in the barrel, and a permanent magnet being fixedly mounted around the barrel of the lens unit and moving with the lens unit when the lens unit is in a telescopic movement during operation. Upper and lower coil seats are mounted around the lens unit and are arranged at upper and lower sides of the magnet, respectively. Upper and lower coils wind around the upper and lower coil seats, respectively. A circuit board supplies a current to each of the coils, wherein the current to each coil has a plurality of square waves in one focusing time for the lens unit to move from one focal point to the other focal point.

The present invention relates, in another aspect, to a method for driving the two-step auto focus camera. The method comprises inputting a current having a plurality of square waves to a motor of the camera during one focusing time as the lens unit moving from one of the two focal points to the other focal point.

Other advantages and novel features of the present invention will be drawn from the following detailed description of a preferred embodiment of the present invention with attached drawings, in which:

BRIEF DESCRIPTION OF THE DRAWINGS

Many aspects of the present two-step auto focus camera and method for driving the same can be better understood with reference to the following drawings. The components in the drawings are not necessarily drawn to scale, the emphasis instead being placed upon clearly illustrating the principles of the present two-step auto focus camera and method for driving the same. Moreover, in the drawings, like reference numerals designate corresponding parts throughout the several views.

DETAILED DESCRIPTION OF THE INVENTION

Figure 1:
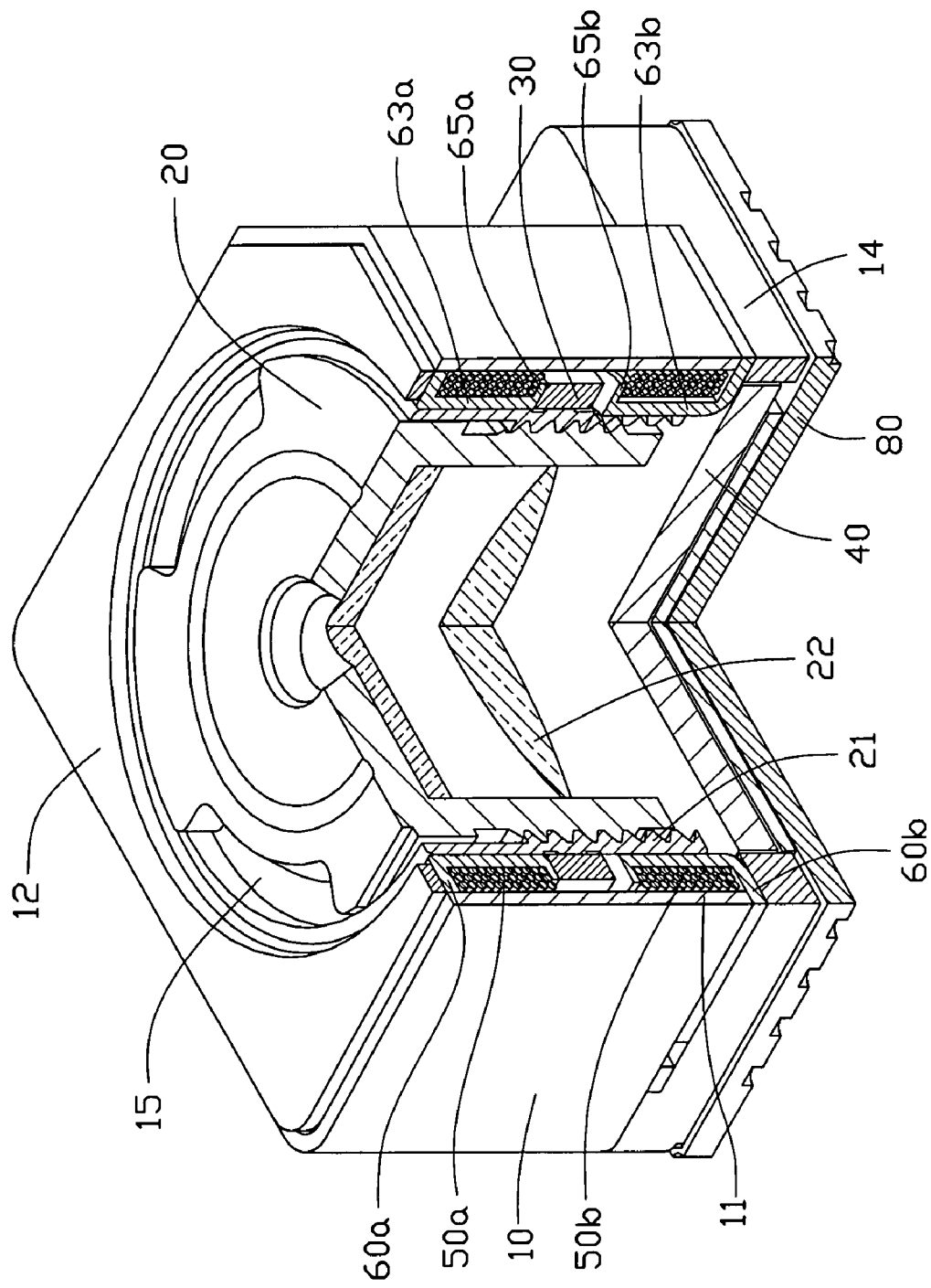
FIG. 1 is an isometric view of a two-step auto focus camera in accordance with a preferred embodiment of the present invention, wherein a part of the auto focus camera is cut away for clarity.

Referring to FIG. 1, a two-step auto focus camera in accordance with a preferred embodiment of the present invention includes a lens mount 10, a lens unit 20 received in the lens mount 10, and a motor (not labeled) for driving the lens unit 20 into telescopic movement.

The lens mount 10 includes a square-shaped base 14, a hollow cuboid-shaped sidewall 11 mounted on the base 14, and a square-shaped cover 12 mounted on the sidewall 11. The base 14, the sidewall 11 and the cover 12 cooperatively define a space (not labeled) receiving the lens unit 20 and the motor therein. An aperture 15 is defined in a central portion of the cover 12 for telescopic extension of the lens unit 20 therethrough. A circuit board 80 with an image sensor 40 mounted thereon is arranged under the base 14 of the lens mount 10. The circuit board 80 is electrically connected with a power source to supply currents to the motor.

The lens unit 20 is approximately column-shaped and has an outer diameter approximately the same as a diameter of the aperture 15 of the cover 12. The lens unit 20 includes a barrel 21 and a lens 22 mounted in the barrel 21. The barrel 21 forms an inner thread (not labeled) on an inner surface thereof, and the lens 22 forms an outer thread (not labeled) on an outer surface thereof, which threadedly engages with the inner thread of the barrel 21. When assembled an interspace is defined between the lens mount 10 and the lens unit 20 for receiving the motor therein. The motor includes a permanent magnet 30 fixedly mounted around a middle of the outer surface of the barrel 21 to move with the lens unit 20. Upper and lower coil seats 60a, 60b with upper and lower coils 50a, 50b wound thereon are arranged at upper and lower sides of the magnet 30, respectively. The coil seats 60a, 60b are made of material such as silicone steel, which can be easily magnetized when a magnetic field is applied thereto. Each of the coil seats 60a, 60b includes a base wall 65a, 65b and a ring-shaped flange 63a, 63b extending perpendicularly from an inner circumference of the base wall 65a, 65b. A distance along an axial direction between the base walls 65a, 65b of the upper and lower coil seats 60a, 60b is larger than a height of the permanent magnet 30. The upper and lower coils 50a, 50b wind on the flanges 63a, 63b of the upper and lower coil seats 60a, 60b, respectively. The two coils 50a, 50b have opposite winding directions. The ends of the coils 50a, 50b are electrically connected to the circuit board 80.

Figure 2:
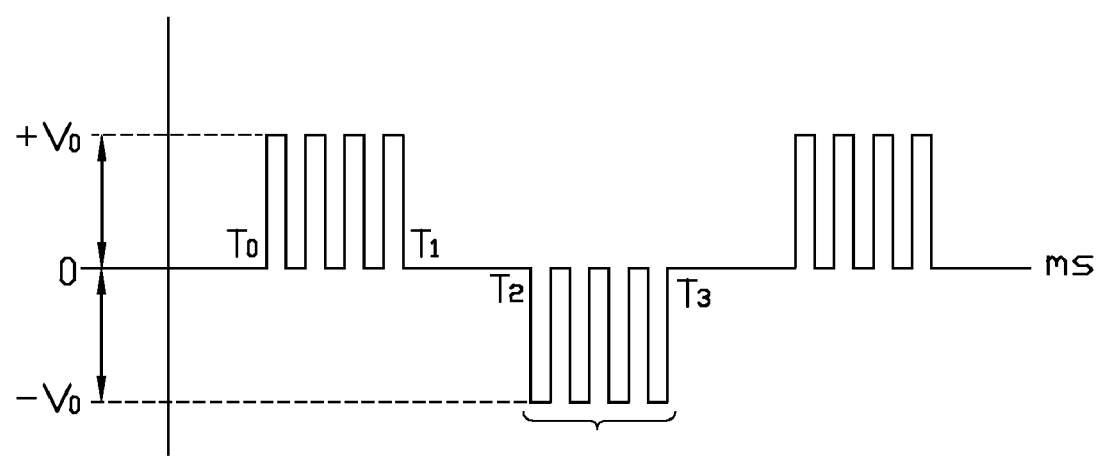
FIG. 2 is a graph indicating a voltage of a current supplied to a coil of the two-step auto focus camera of FIG. 1.

During operation, a current is supplied to each of the coils 50a, 50b by the power source. The power source offers an alternating current, such as sine wave current or a cosine wave current. A rectification circuit interconnects the power source and the coils 50a, 50b to switch the sine wave or cosine wave current of the power source to square wave current for the coils 50a, 50b. As shown in FIG. 2, in this embodiment, the current of each coil 50a, 50b includes four square waves in one focusing time T. The focusing time T means the time needed for the lens unit 20 and the magnet 30 to move from one focal point to the other focal point of the camera, such as T0~T1 or T2~T3, which usually is 30~50 ms. The square waves have the same cycle. A voltage of the current in first half cycle of each of the square waves is +V0, and a voltage of the current in second half cycle of each of the square waves is 0.

Figure 3:
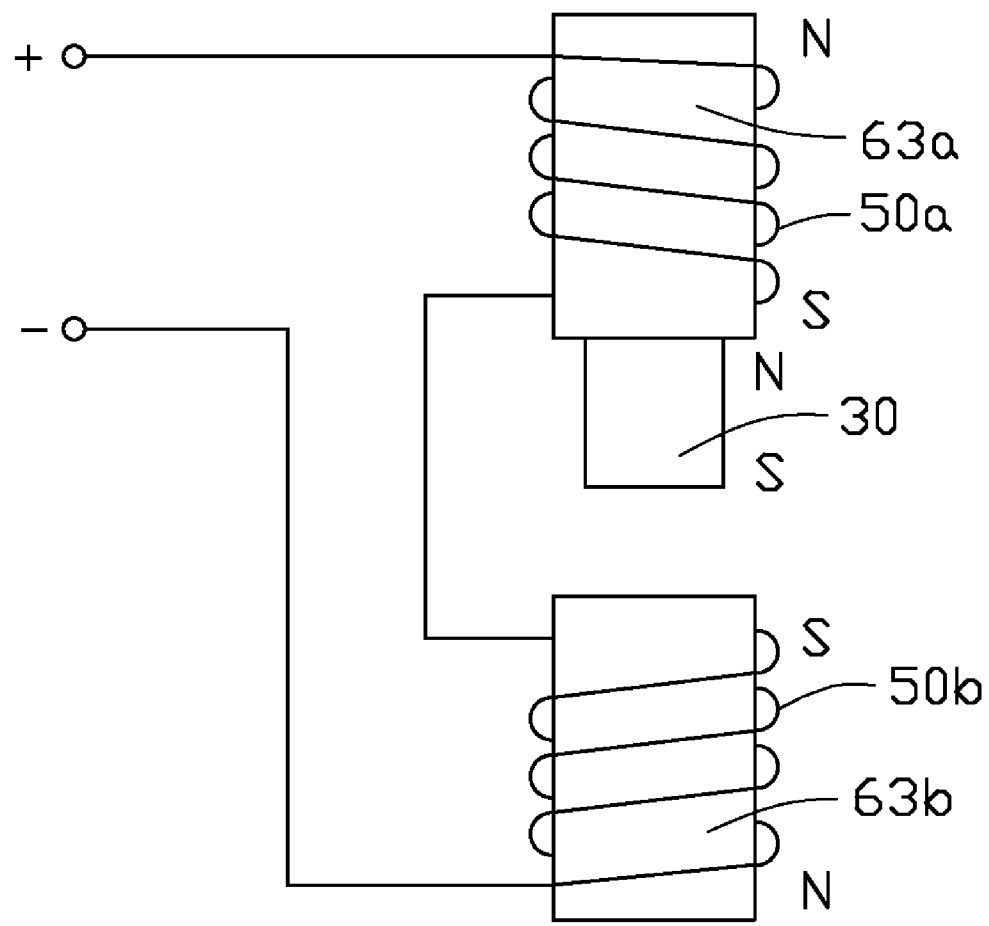
FIG. 3 is a diagrammatic view showing a position of the two-step auto focus camera at its front focal point.
Figure 4:
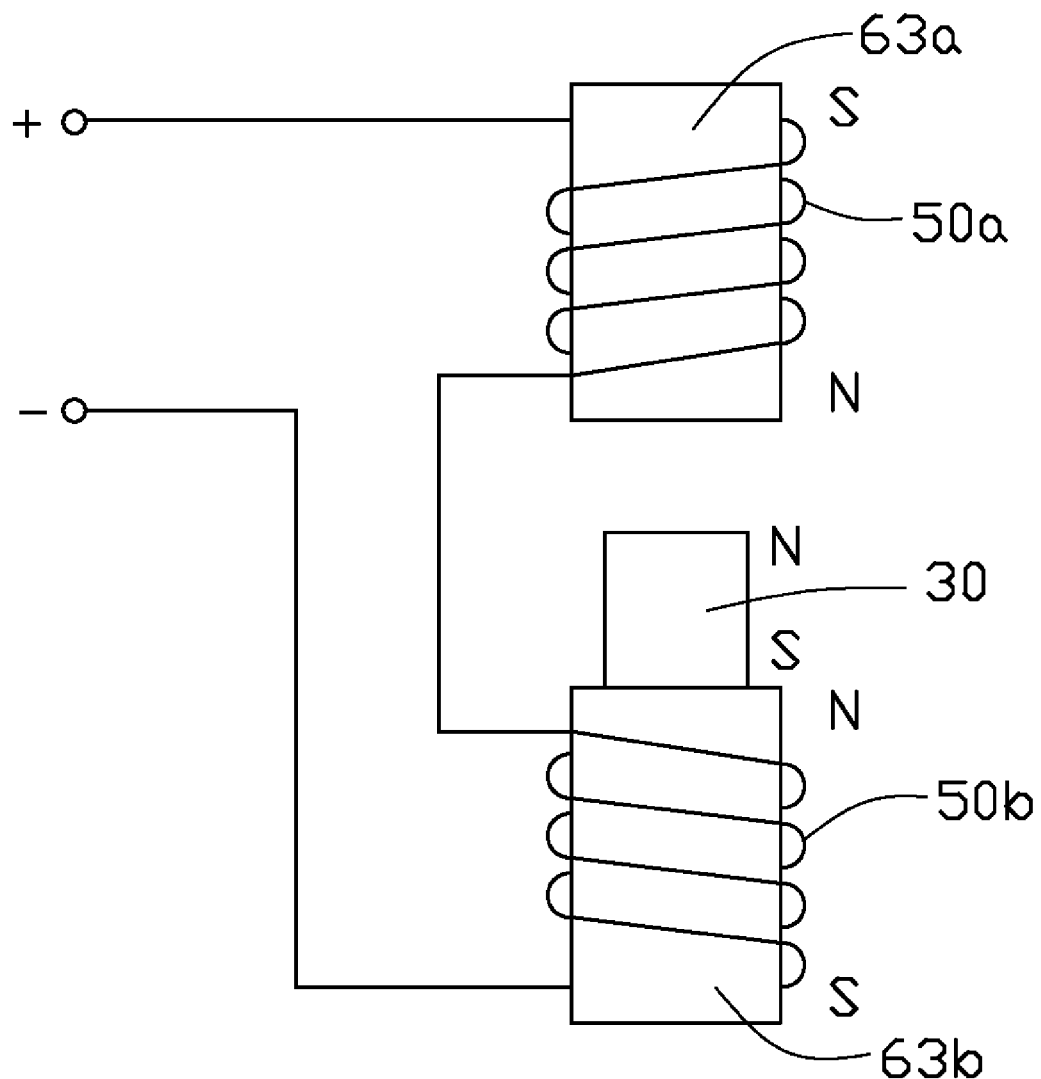
FIG. 4 is similar to FIG. 3, but showing the two-step auto focus camera at its rear focal point.

Please refer to FIG. 3, assuming that the upper side of the magnet 30 is N (north pole), and the lower side of the magnet 30 is S (south pole). The lens unit 20 is initially at its front focal point where the magnet 30 contacts a bottom end of the upper coil seat 60a and then moves to its rear focal point where the magnet 30 contacts the top end of the lower coil seat 60b, as shown in FIG. 4. When the currents are supplied to the coils 50a, 50b, during each first half cycle, the upper and lower coils 50a, 50b each establish an induced magnetic field. The induced magnetic fields established by the upper and lower coils 50a, 50b have polarities opposite to each other for the opposite winding directions thereof. As shown in FIG. 4, the induced magnetic field of the upper coil 50a has a polarity opposite to that of the magnet 30. A top end of the upper coil seat 60a is S, whilst the bottom end of the upper coil seat 60a near the upper side of the magnet 30 is N. The induced magnetic field of the lower coil 60b has the same polarity as that of the magnet 30. A bottom end of the lower coil seat 60b is S, whilst a top end of the lower coil seat 60b positioned near the lower side of the magnet 30 is N. Thus an attractive force is generated between the lower coil seat 60b and the magnet 30 during each first half cycle of the four waves, whilst a repelling force is generated between the upper coil seat 60a and the magnet 30 during each first half cycle of the four waves. The lens unit 20 with the magnet 30 fixedly mounted thereon moves downwardly to its rear focal point from the bottom end of the upper coil seat 60a to the top end of the lower coil seat 60b. Thus, during the focusing time, there are four chances to drive the lens unit 20 to move rearwards; the lens unit 20 can overcome the rough contacting surfaces of the lens unit 20 and the motor to move to the rear focal point continually. After the lens unit 20 reaches the rear focal point, as shown in FIG. 2, during the period T1~T2, the current supplied to the upper and lower coils 50a, 50b is switched off. The coil seats 60a, 60b have residual magnetic forces, which interact with the magnetic force of the permanent magnet 30 thereby holding the lens unit 20 at the rear focal point.

On the other hand, when the lens unit 20 is at the rear focal point and moves to the front focal point, the currents are supplied to the coils 50a, 50b with a direction different from that for moving the lens unit 20 from the front focal point to the rear focal point. As shown in FIG. 2, during the period T2~T3, a voltage of the current in each first half cycle of the square waves is −V0, and a voltage of the current in each second half cycle of the square waves is 0. In this situation, as shown in FIG. 3, the polarities of the upper and lower coil seats 60a, 60b are switched accordingly. Attractive force is generated between the upper coil seat 60a and the magnet 30 during each first half cycle of the four waves, and repelling force is generated between the lower coil seat 60b and the magnet 30 during each first half cycle of the four waves of the current. The lens unit 20 with the magnet 30 moves upwardly to its front focal point from the top end of the lower coil seat 60b to the bottom end of the upper coil seat 60a under the attractive force of the upper coil seat 60a and the repelling force of the lower coil seat 60b. Also since the current has four square waves in the focusing time, the lens unit 20 can overcome the rough contacting surfaces of the lens unit 20 and the motor to move to the front focal point continually. Thus, the lens unit 20 can be reliably driven to reach a required focal position by the multi-waves current. It is understood that the number of waves of the current is not limited to be four; it can be more or less. For the short focusing time T, the number of the waves of the current in one focusing time is usually no more than 10.

Figure 5:
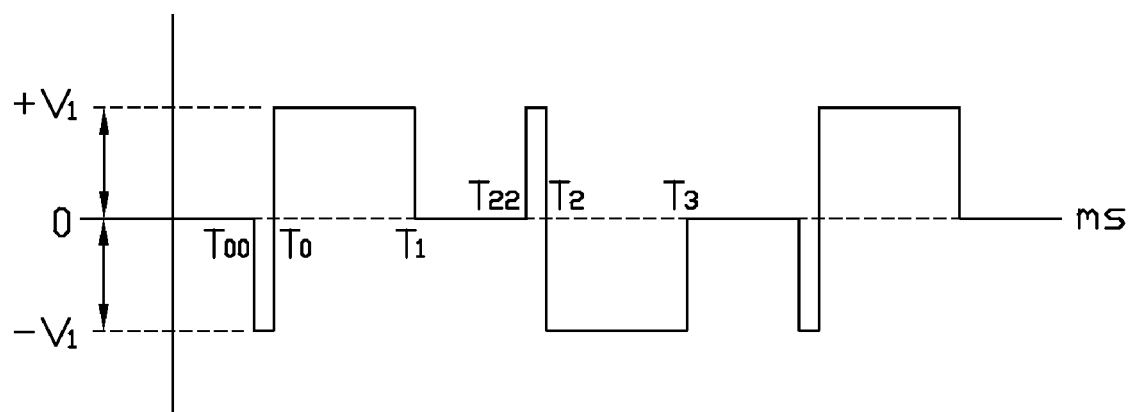
FIG. 5 is a graph showing the voltage of the current of the coil according to an alternative embodiment of the present invention.
Figure 6:
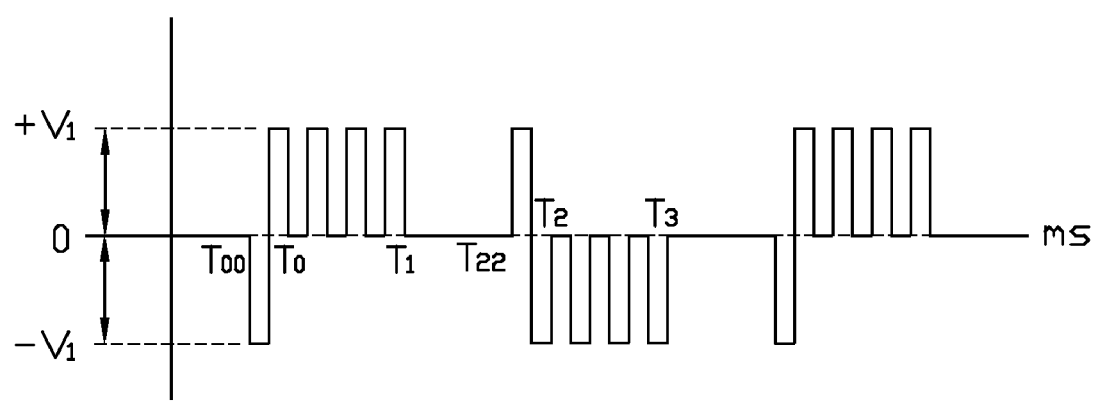
FIG. 6 is a graph showing a third embodiment of the voltage of the current of the coil.

FIG. 5 shows an alternative embodiment of the current supplied to the coils 50a, 50b. In one focusing time, T00~T1 or T22~T3, the current has two waves. The two waves have cycles different from each other. The cycle of the first wave from T00 to T0 or T22 to T2 is only about ⅒ of that of the second wave from T0 to T1 or T2 to T3. The first wave has a voltage −V1 which is the same as the second wave +V1 in value but different in direction. Thus, initially the lens unit 20 moves to the upper coil seat 60a during the period of the first cycle. Then, a repelling force is exerted to the lens unit 20 by the upper coil seat 60a to drive the lens unit 20 to move downwardly to the lower coil seat 60b. Such a design can facilitate a startup movement of the lens unit 20. Referring to FIG. 6, the current in accordance with a third embodiment is shown. In this embodiment, during each focusing time, T00~T0 or T22~T2, the current has five waves. The five waves have the same cycle. Each wave has a voltage the same as the other waves in value. The voltage of the first cycle from T00 to T0 is opposite to the other four waves in direction.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A two-step auto focus camera with two focal points, comprising:
   a lens unit including a barrel and a lens received in the barrel;
   a permanent magnet being fixedly mounted around the barrel of the lens unit, and moving with the lens unit when the lens unit is in telescopic movement during operation;
   upper and lower coil seats being mounted around the lens unit and being arranged at upper and lower sides of the magnet, respectively;
   upper and lower coils winding around the upper and lower coil seats, respectively; and a circuit board supplying a current to each of the coils, the current to each coil having a plurality of square waves in one focusing time for the lens unit to move from one focal point to the other focal point;

wherein a first wave of the plurality of waves is the same as the other ones of the plurality of waves in value but opposite in direction.

2. The two-step auto focus camera of claim 1, wherein the current has no more than ten waves and each of the waves has the same cycle.

3. The two-step auto focus camera of claim 1, wherein the current has the first wave and a following second wave in the one focusing time, the first wave has a cycle being not larger than $1/10$ of that of the second wave.

4. The two-step auto focus camera of claim 1, wherein a voltage of signal supplied to the coils between two adjacent waves is 0.

5. The two-step auto focus camera of claim 1, wherein magnetic fields established by the two coils have polarities opposite to each other.

6. The two-step auto focus camera of claim 5, wherein the two coils have opposite winding directions.

7. A method for driving a lens unit of a two-step auto focus camera to move between two focal points thereof for focusing, comprising inputting a current having a plurality of square waves to a motor of the camera during one focusing time as the lens unit moving from one of the two focal points to the other focal point, wherein the inputting of the current comprises firstly inputting a first wave and then imputing a second wave, the first and second waves having opposite directions.

8. The method of claim 7, wherein a cycle of the first wave being not larger than $1/10$ of that of the second wave.

9. The method of claim 7, wherein the second wave comprises a plurality of square waves, and all of the square waves of the first and second waves have the same cycle.

10. The method of claim 7, wherein the first and second waves have the same value.

11. The method of claim 7, wherein a voltage between two adjacent waves is zero.

12. A two-step auto focusing camera comprising:

a lens unit having a barrel, a lens mounted to the barrel and a permanent magnet fixed to the barrel, a movement of the permanent magnet causing the lens and the barrel to move accordingly;

upper and lower coil seats being mounted around the lens unit and being arranged at upper and lower sides of the magnet, respectively;

upper and lower coils winding around the upper and lower coil seats, respectively;

a printed circuit board electrically connecting with the upper and lower coils and supplying a current thereto;

wherein the current has at least first and second groups of square waves, the at least first group of square waves causing the magnet to move upwardly, and the at least second group of square waves causing the magnet to move downwardly; and wherein the at least first group of square waves has a first wave which is the same in value as other square waves of the at least first group of square waves, but different in direction.

13. The two-step auto focus camera of claim 12, wherein the at least first group of square waves has the first wave and a following second wave, and the first wave has a cycle being not larger than $1/10$ of that of the following second wave.

14. The two-step auto focus camera of claim 12, wherein the at least first group of square waves has no more than ten waves, and the first wave has the same cycle as the other ones of the at least first group of square waves.

* * * * *